July 18, 1950 U. L. McCROSKEY 2,515,724
WIRE GUIDE FOR CONDUITS

Filed Aug. 27, 1947 2 Sheets-Sheet 1

INVENTOR.
ULMONT L. McCROSKEY
BY
Victor J. Evans & Co.
ATTORNEYS

Patented July 18, 1950

2,515,724

UNITED STATES PATENT OFFICE 2,515,724

WIRE GUIDE FOR CONDUITS

Ulmont L. McCroskey, Los Angeles, Calif.

Application August 27, 1947, Serial No. 770,877

2 Claims. (Cl. 175—376)

My present invention relates generally to electrical wiring equipment and wire placing apparatus, and more specifically to an improved wire guide for electrical conduits employed in the wiring systems for walls of houses and other building structures. The primary object of the invention is the provision of an attachment for an electrical wire conduit or pipe by means of which the cable or wires may be inserted in, and fed or pulled through, step-by-step, the conduit or pipe; thereby guiding the cable or wire and also protecting the insulating material or jacket of the cable or wire from abrasive action tending to expose the bare wire.

The wire guide of my invention includes a minimum number of parts that may with facility be manufactured at low cost of production, and assembled with convenience to assure a unitary structure which may readily be installed either for temporary use, or if desired as a permanent fixture in the system of conduits for the electrical wiring of a dwelling or other building structure.

The invention consists in certain novel features of construction and combinations and arrangements of parts as will hereinafter be described in detail and more particularly set forth in the appended claims.

In the accompanying drawings I have illustrated a complete example of a physical embodiment of my invention in which the parts are combined and arranged in accord with one mode I have devised for the practical application of the principles of my invention. It will however be understood that changes and alterations are contemplated and may be made in these exemplifying drawings and mechanical structures within the scope of my claims without departing from the principles of the invention.

Figure 1:
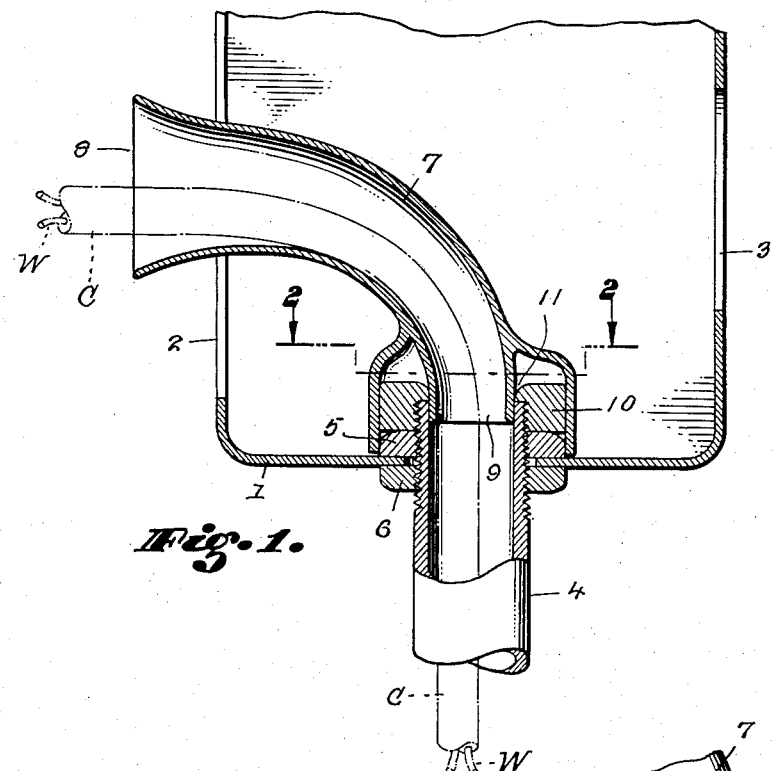
Figure 1 is a vertical sectional detail view showing an outlet box or housing and conduit for electrical wires and equipped with the wire guide of my invention.
Figure 2:
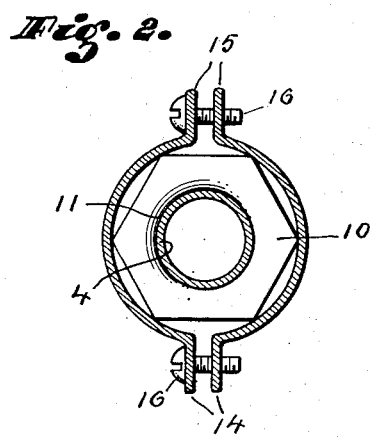
Figure 2 is a transverse horizontal sectional view at line 2—2 of Fig. 1.
Figure 3:
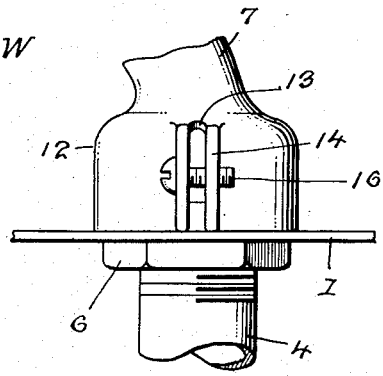
Figure 3 is a fragmentary exterior view showing the clamp joint between the guide and the conduit or pipe.
Figure 5:
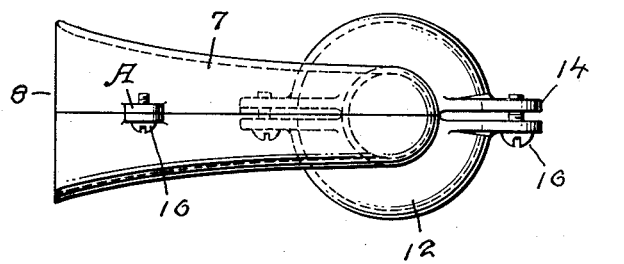
Figure 5 is a top plan view of the guide, detached.
Figure 4:
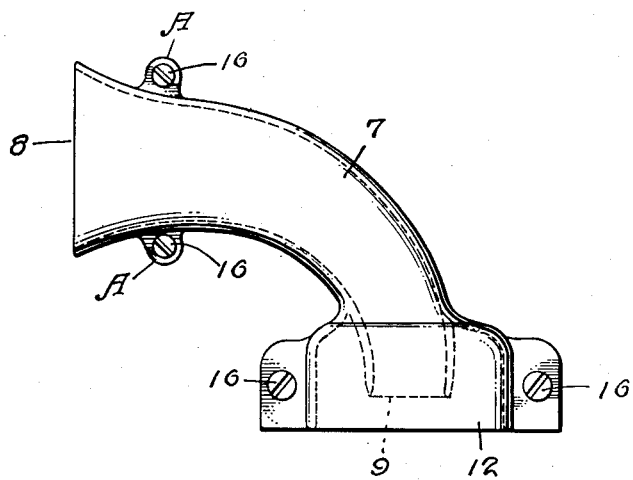
Figure 4 is a view in side elevation of the guide.

In order that the general arrangement and utility of parts may readily be understood I have disclosed in Fig. 1, which is an assembly view, a portion of a conventional wiring or outlet box or wall housing I having usual side slots or openings 2 and 3 for selective use, and the box or housing is mounted at the upper end of a wire conduit or pipe 4 with a permanent joint.

The upper threaded end of the conduit passes through a hole in the bottom of box I, and an interior lock nut 5, together with an exterior lock nut 6 rigidly clamp the conduit or pipe to the box, with the extreme end of the tubular conduit projecting above the interior nut 5.

In carrying out my invention I provide a guide device or elbow for the cable C with its wires W, so that the insulated cable may with facility be inserted through the clamped joint and into the tubular conduit, and then pulled, or fed step-by-step, through the conduit or pipe to the desired length, and this performance is accomplished without the hazard of marring or abrading the insulation jacket of the cable, and to assure durability and safety in the house wiring.

For this purpose I utilize a preferably sectional hood or arcuate tube, of curved elbow shape that is cylindrical in cross section and provided with a smooth bore, and this guiding hood or nozzle 7, here shown as made up of duplicate sections, is rigidly united by screws 15 in perforated lugs or ears A, A of the sections, together with other clamp screws 16, as will be described.

The curved tubular hood 7, which may be a single integral unitary structure, is fashioned with an outwardly flaring outer end or mouth 8 that projects outwardly through one of the slots of the box I, for the insertion of an end of the cable C, and this tubular structure terminates in a normal size interior sleeve 9 that is adapted to be alined with the conduit or pipe 4, to guide and direct the cable into the tubular conduit. The sleeve or nipple 9, which is fashioned with smooth and rounded edges, is utilized for centering the guide in the upper open end of the tubular conduit, and to insure a smooth and compact joint a base nut 10 is threaded on the extreme end of the tubular conduit 4 and provided with an upper smooth bore 11 for the reception and retention of the sleeve or nipple 9.

For rigidly attaching the guide hood to the tubular conduit and box, the hood is fashioned with an integral exterior cylindrical bonnet or bell 12 of resilient material, which forms a split clamping band for engagement with the interior nuts 5 and 10. The clamping band is provided with a diametrically arranged pair of open end slots 13, 13, and the band is fashioned with two pairs of outstanding perforated flanges 14, and 15, each pair equipped with one of the fastening screws 16.

From this description taken in connection with the drawings it will be apparent that the curved tubular hood, or outwardly flaring bell-shaped sleeve 7 with its nipple 9 provide guiding means for the insertion of a cable or wires into the tubular conduit, and the smooth interior bore of the sleeve and nipple, together with the bell-shaped mouth of the guide, minimize the friction of the bent cable, and eliminate the hazard of abrading the insulating jacket of the cable, or the insulating material of the wires.

As a temporary attachment, and after the guide has performed its functions, the clamp band or bell may be released by loosening the clamp screws 16, for removal of the guide sleeve, and the installation of the electrical fixtures in the outlet box or housing. In some instances and for various purposes the tubular hood or sleeve may be attached to a tubular conduit or pipe, and remain as a permanent fixture.

Having thus fully described my invention, what I claim as new and desire to secure by Letters Patent is:

1. In an outlet box conduit wire guide, the combination which comprises an elbow having a small end of a size suitable for insertion in the end of a conduit and a larger outwardly flared outer end with the inside diameter of said elbow gradually increasing from the small end to the said larger outer end, the axis of one end being positioned at an angle of 90° to the axis of the other end, and the said small end thereof having an enlarged bell integral with the elbow and extended outwardly from and beyond the said small end and said bell being split at diametrically opposite points with flanges extended outwardly on the sides of the said split, clamping screws in the flanges of the said bell, and a base nut having a bore to receive the small end of the elbow and an internally threaded counter bore for receiving a threaded end of a conduit positioned in the said bell for retaining the small end of the said elbow in operative relation with the conduit.

2. In an outlet box conduit wire guide, the combination which comprises a box like body member having a base with side walls having conduit receiving openings therein, a conduit having a threaded end extended into one of said openings of the body member, lock nuts on the conduit positioned on opposite sides of the wall of the body member, an elbow having a small end of a size suitable for insertion in the end of a conduit and a larger outwardly flared outer end with the inside diameter of said elbow gradually increasing from the small end to the said larger outer end, the axis of one end being positioned at an angle of 90° to the axis of the other end, and the said small end thereof having an enlarged bell integral with the elbow and extended outwardly from and beyond the said small end and said bell being split at diametrically opposite points with flanges extended outwardly on the sides of the said split, clamping screws in the flanges of the said bell, and a base nut having a bore to receive the small end of the elbow and an internally threaded counter bore for receiving the threaded end of a conduit positioned in the said bell for retaining the small end of the said elbow in operative relation with the conduit.

ULMONT L. McCROSKEY.

REFERENCES CITED

The following references are of record in the file of this patent:

UNITED STATES PATENTS

| Number | Name | Date |
|--------|------|------|
| 594,020 | Johnston | Nov. 23, 1897 |
| 1,812,961 | Kent | July 7, 1931 |
| 1,959,490 | Mistelski | May 22, 1934 |
| 2,213,363 | Creswell | Sept. 3, 1940 |
| 2,286,781 | Abramson | June 16, 1942 |
| 2,321,415 | Peltz et al. | June 8, 1943 |